Nov. 10, 1925.
M. H. BREDE
1,560,654
CLOSURE CAP AND LOCK FOR FILLER NECKS AND THE LIKE
Filed June 28, 1923
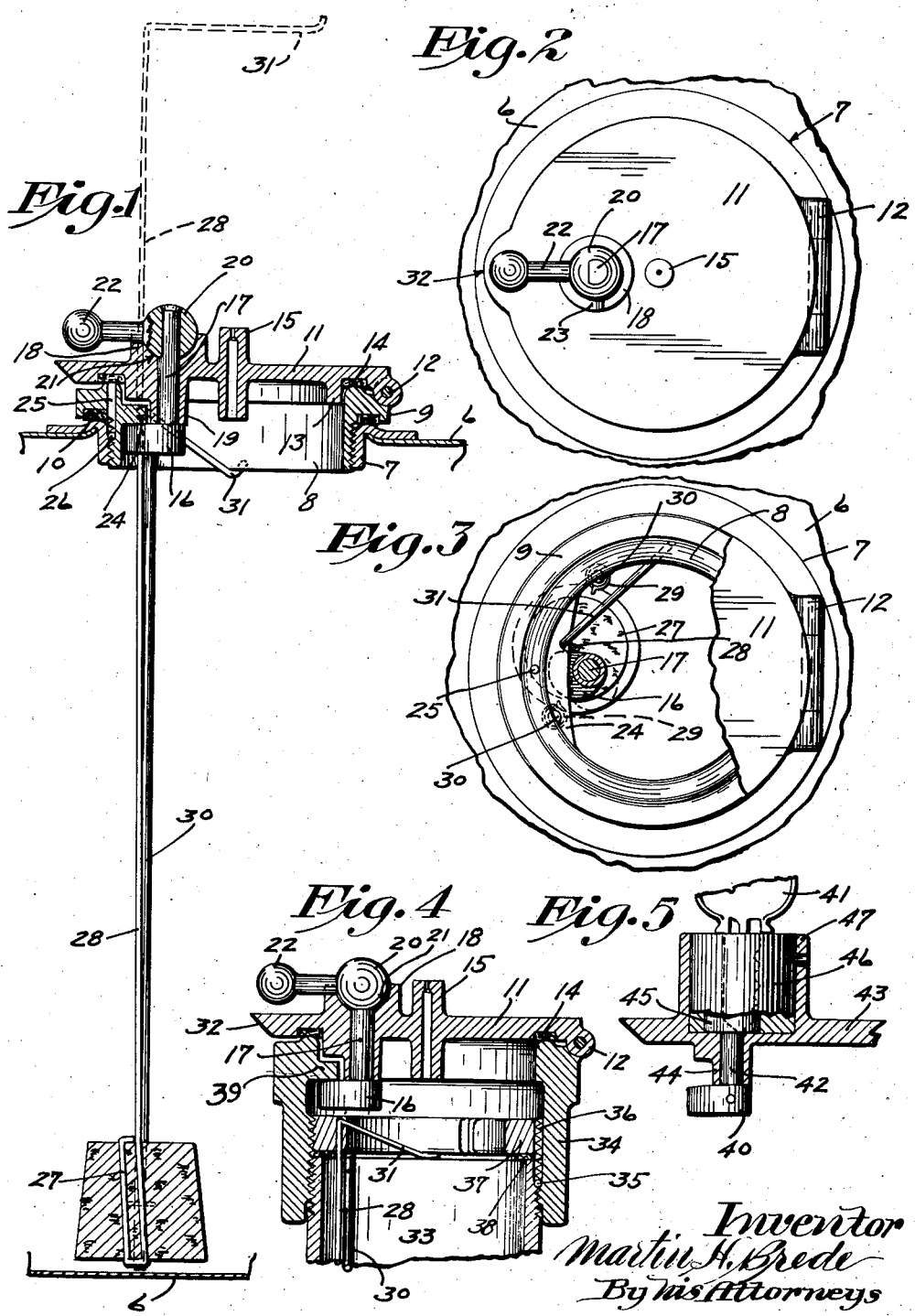

Patented Nov. 10, 1925.

1,560,654

UNITED STATES PATENT OFFICE.

MARTIN H. BREDE, OF MINNEAPOLIS, MINNESOTA.

CLOSURE CAP AND LOCK FOR FILLER NECKS AND THE LIKE.

Application filed June 28, 1923. Serial No. 648,259.

*To all whom it may concern:*

Be it known that I, MARTIN H. BREDE, a citizen of the United States, residing at Minneapolis, in the county of Hennepin and State of Minnesota, have invented certain new and useful Improvements in Closure Caps and Locks for Filler Necks and the like; and I do hereby declare the following to be a full, clear, and exact description of the invention, such as will enable others skilled in the art to which it appertains to make and use the same.

My present invention has for its primary object to provide an extremely simple and highly efficient closure cap and lock designed for general use, but especially adapted as a substitute for the filler cap of an automobile gasoline tank or radiator. Said invention further provides a gasoline indicator for use in connection with the improved closure cap.

To the above end, generally stated, the invention consists of the novel devices and combinations of devices hereinafter described and defined in the claim.

In the accompanying drawings, which illustrate the invention, like characters indicate like parts throughout the several views.

Referring to the drawings:

Fig. 1 is a view principally in central vertical section illustrating a filler cap for an automobile gasoline tank designed in accordance with one form of my invention, some parts being broken away;

Fig. 2 is a plane view of the invention as illustrated in Fig. 1;

Fig. 3 is a view corresponding to Fig. 2 with the exception that certain parts thereof have been broken away to expose certain parts within the filler cap;

Fig. 4 is a view corresponding to Fig. 1 with the exception that the filler cap is designed for use in connection with the filler neck of an automobile radiator; and Fig. 5 shows a modification of the lock for the cover of the filler cap.

Referring first to the invention as illustrated in Figs. 1 to 3, inclusive, the numeral 6 indicates a portion of an automobile tank having the customary filler neck or sleeve 7 which, as shown, is internally screwthreaded. The filler cap for the filler neck 7 includes a sleeve-like body 8 having at its top an outstanding flange 9, and below this flange said body is provided with external screw threads adapting said body to be screwed into said filler neck. Seated in the under side of the flange 9 is a pliable gasket 10 arranged to engage the filler neck 7 and form a liquid-tight joint therewith.

This filler cap further includes a cover 11 hinged at 12 to the body 8, and which cover overlies said body and is provided with a depending annular flange 13 which extends therein. Seated in the under face of the cover 11, outward of the flange 13, is a pliable gasket 14 which, when the cover 11 is closed, bears upon the body 8 to form a liquid-tight joint therewith. Integrally formed with the cover 11, at the axis thereof, is an upright vent tube 15 which extends both above and below said cover, and the opening in its extreme upper end is contracted which, together with the extended end of said vent tube, prevents gasoline in the tank from splashing therethrough.

To secure the cover 11 closed, I provide a latch of novel construction, and which latch includes a movable cam-acting member 16 rigidly and eccentrically secured to the lower end of a short upright shaft 17 that extends completely through the cover 11 at a point diametrically opposite the hinge 12 and is rotatably mounted in a borelike bearing formed in said cover. This bearing is extended both above and below the cover 11 by forming with said cover bosses 18 and 19, respectively. On the upper end of the shaft 17 is rigidly secured a head 20 in the form of a ball seated in a socket 21 formed in the boss 18, and which head is provided with a horizontally and radially extended handle 22 which affords means by which the movable latch member 16 may be turned. A circumferential notch 23 in the periphery of the boss 18 for the handle 22 limits the swinging movement thereof..

Co-operating with the movable member 16 is a fixed latch member 24 in the form of a shoulder or web which extends circumferentially into the body 8 from one side thereof. The upper face of the movable latch member 16 is in the form of a circumferentially extended cam arranged to engage the under side of the fixed latch m' ..ber 24 under a swinging movement of the movable latch member 16 by the handle 22. This engagement of the movable latch member 16 with the fixed latch member 24 will draw the shaft 17 endwise downward, tightly seat the head 20 in the socket 21, and hold the cover 11 in position to compress the gasket 14 and form a tight joint. Obviously, the frictional engagement between the two lock members 16 and 24 and the head 20 in the socket 21 will hold the movable latch member 16 where set to latch the cover 11 closed.

To latch the filler cap in the filler neck 7 and thereby prevent the same from being removed therefrom, there is drilled from the top of the body 8 a hole 25 which extends downward into the screw threads at the joint between the body 8 and filler neck 7, and in this hole is dropped a ball 26.

For use in connection with the improved filler cap just described I provide an indicator, for the gasoline level in the tank 6, in the form of a cork or other float 27 having a stem 28 which extends obliquely upward through a bore in the fixed latch member 24 with freedom for endwise sliding movement and is guided thereby. To guide the float 27 there is secured thereto, at diametrically opposite points, eyes 29 through which extend a pair of depending rods 30 secured to the body member 8.

The upper end of the float stem 28 above the fixed latch member 24 is bent laterally to form a yielding hook-like arm 31 arranged to be sprung into interlocking engagement with the lower end of the body 8 to hold the stem 28 with the float 27 depressed.

To determine the level of the gasoline in the tank 6 it is only necessary to release the arm 31 to permit the float 27 to rise and project the stem 28. It will be noted that when the float is held depressed by the arm 31 it will be close to the bottom of the tank 6 so that the float, when released, will indicate the level of the gasoline when the same is very low. It is important to note that the stem 28, guide rods 29 and lock arm 31 are entirely at one side of the tubular body 8 so as not to interfere with the filling of the tank 6 with gasoline through the filler neck. To permit the cover to be easily opened, the same is provided with an undercut lip extension 32 to afford a finger hold, as best shown in Fig. 2.

Referring now to the invention as illustrated in Fig. 4, the numeral 33 indicates the filler neck of an automobile radiator, which is of standard form, and which neck is provided with external screw threads. The filler cap for this form of filler neck is identical with the filler caps shown in Figs. 1, 2 and 3 with the exception that its sleeve-like body 34 is made much longer than the body 8 and is of such diameter as to fit around the filler neck 33 and has screw-threaded engagement therewith. The body 34 is locked in the filler neck 33 in the same manner that the body 8 is locked to the filler neck 7, to wit: by a ball 35 dropped into a bore 36 in the screw-threaded joint between said body and filler neck. An internal collar 37 has screw-threaded engagement with the internal screw threads of the body 34 and is positioned above the filler neck 33. A pliable packing 38 is compressed between the upper end of the filler neck 33 and the internal collar 37 to form a liquid-tight joint between said neck and the body 34. The float stem 28 is mounted to slide endwise in a bore in the internal collar 37, and its lock arm 31 is arranged to yieldingly engage the under face of said collar to hold the stem 28 with the float 27 depressed. The fixed lock member 39 is formed in the same manner that the latch member 24 is formed, and the action of the movable lock member thereon is the same as that previously described.

Referring now to the invention as illustrated in Fig. 5, the movable latch member 40 is actuated by a key 41. The movable latch member 40 is secured to the lower end of a short upright shaft 42 journaled in a closure cap cover 43 and a depending boss 44 on the under side of said cover. At its upper end, the shaft 42 is secured to a lock tumbler 45 journaled in a lock casing 46 which, in turn, is permanently and rigidly secured within a cylindrical holder 47 integrally formed with the top of the cover 43. The tumbler 45 is normally locked to the casing 46 by means of spring-projected pins, not shown, as in well known locks. While the fixed latch members 24 and 39 are illustrated as webs extending into the interior of the body of the filler cap, in some instances it might be desirable to form such members by cutting a circumferential groove in the interior of the body of the filler cap of such depth as to permit the movable lock member to swing therein and engage the under surface thereof.

The above described lock, while extremely simple and easy to operate, has, in actual usage, proven highly efficient for the purpose had in view. By means of this lock the cover will always be securely held closed for the reason that the cam surface of the movable lock member will take up wear.

What I claim is:

The combination with a filler cap having a sleeve-like body, and a cover hinged to said body, of a clamp-acting latch for holding the cover closed including a fixed internal latch member on said body, a shaft, said cover having a bore extending therethrough and in which the shaft is turnably mounted, the outer end of said bore being expanded to form a spherical seat in the top of the cover, said shaft having on its outer end a handle-equipped spherical head mounted in said seat, and an eccentric latch member on the inner end of the shaft arranged to be moved into and out of engagement with the fixed latch member by the turning movement of the shaft, one of said latch members being provided with a cam-acting surface.

In testimony whereof I affix my signature.

MARTIN H. BREDE.